UNITED STATES PATENT OFFICE.

CHARLES JAMES MOUNTFORD, OF BIRMINGHAM, COUNTY OF WARWICK, ENGLAND.

MIXED PAINT.

SPECIFICATION forming part of Letters Patent No. 339,070, dated March 30, 1886.

Application filed March 10, 1885. Serial No. 158,358. (Specimens.)

*To all whom it may concern:*

Be it known that I, CHARLES JAMES MOUNTFORD, a citizen of England, residing at Birmingham, in the county of Warwick, England, paint manufacturer, have invented a new and useful Fire-Proof and Water and Acid Resisting Paint, of which the following is a specification.

My invention relates to the manufacture of a fire-proof and water and acid resisting paint, which I effect in the following manner: To about five pounds of powdered asbestus I add four pounds of barytes and one pound of zinc oxide. I grind this mixture very fine and thoroughly dry it. I then pug it with about eleven pounds of solution of an alkaline silicate at a strength of about 30° Baumé, and I thus produce a paint ready for use, which, when applied, is fire-proof and capable of resisting the action of acid or water.

Having thus described the nature of my invention and the best means I know of carrying the same into practice, I claim—

A paint composition consisting of powdered asbestus, barytes, zinc oxide, and an alkaline silicate solution, substantially as and for the purpose herein set forth.

In testimony whereof I have signed my name to this specification, in the presence of two subscribing witnesses, this 16th day of February, 1885.

CHARLES JAMES MOUNTFORD.

Witnesses:
G. W. WESTLEY,
WALTER JAMES SKERTEN.